United States Patent [19]

Matsushita et al.

[11] Patent Number: 4,697,128

[45] Date of Patent: Sep. 29, 1987

[54] CONTROL APPARATUS FOR A ROTOR SUPPORTED BY AN ELECTROMAGNETIC BEARING

[75] Inventors: Osami Matsushita; Michiyuki Takagi; Mitsuho Yoneyama; Toyomi Sugaya, all of Ibaraki, Japan

[73] Assignee: Hitachi, Ltd., Tokyo, Japan

[21] Appl. No.: 861,002

[22] Filed: May 8, 1986

[30] Foreign Application Priority Data

May 13, 1985 [JP] Japan .................................. 60-99564

[51] Int. Cl.$^4$ ............................................... G05B 1/02
[52] U.S. Cl. .................................... 318/607; 318/625; 310/90.5
[58] Field of Search ................ 310/90.5; 318/625, 607

[56] References Cited

U.S. PATENT DOCUMENTS 4,128,795 12/1978 Habermann et al. ................ 318/618

Primary Examiner—William M. Shoop, Jr.
Assistant Examiner—Saul M. Bergmann
Attorney, Agent, or Firm—Antonelli, Terry & Wands

[57] ABSTRACT

The present invention reduces the resonance amplitude of the rotational frequency-synchronous unbalance vibration of a rotor supported by an electromagnetic bearing.

To this end, the invention disposes an X-direction control servo circuit and a Y-direction control servo circuit each of which detects the deviation of the rotor from a desired position in the radial direction thereof and controls the rotor so as to be held at the desired position on the basis of the detection signal, and a tracking filter which is synchronous with the rotational frequency. Outputs from the filter are crossed to supply the Y-direction control servo circuit with the X-directional output and to supply the X-direction control servo circuit with the Y-directional output signal.

4 Claims, 12 Drawing Figures

CONTROL APPARATUS FOR A ROTOR SUPPORTED BY AN ELECTROMAGNETIC BEARING

BACKGROUND OF THE INVENTION

The present invention relates to a control apparatus for a magnetic floating type rotor supported by an electromagnetic bearing. More particularly, it relates to an electromagnetic bearing control apparatus which is well suited to suppress a resonance amplitude of the unbalance vibration of a rotor.

Figure 1:
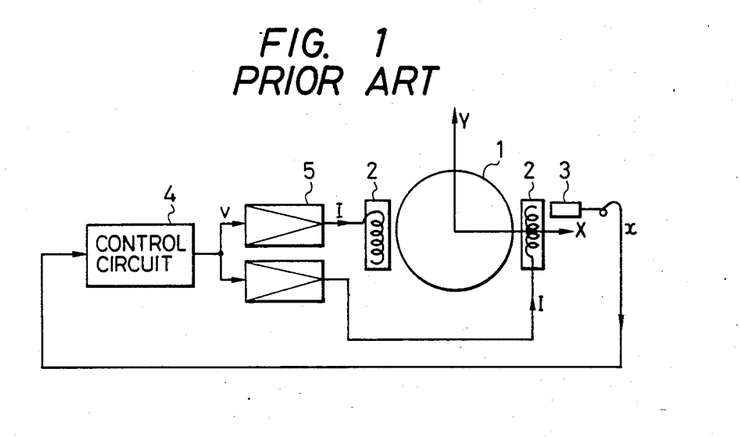
FIG. 1 is a diagram for explaining the servo control operation of an electromagnetic bearing in the prior art.

The schematic setup of a rotary machine supported by an electromagnetic bearing, in which attractive electromagnets are used for bearing, is as shown in FIG. 1. First, an apparatus which performs a unidimensional position control in only an X-axial direction will be described.

Coils 2 of electromagnets are arranged on the right and left of a rotor 1. When the rotor 1 shifts rightwards under this state, a control current I flows through the left electromagnet coil 2, and the rotor 1 undergoes an attractive force so as to be displaced leftwards. To the contrary, when the rotor 1 shifts leftwards, a control current I flows through the right electromagnet coil 2 so as to establish an attractive force. In this manner, the control current I is caused to flow through the electromagnet coil 2 on the opposite side in accordance with the rightward or leftward displacement of the rotor 1, to perform a servo control so that the rotor 1 may come to its central position owing to the resulting attractive force.

In this case, at least one displacement sensor 3 is necessary for detecting the righward and leftward displacements of the rotor 1. Often employed as the displacement sensor 3 are e.g.; noncontacting sensors of the induction coil type, capacitance type, optical type, etc.

A displacement signal x detected by the displacement sensor 3 is applied to a control circuit 4, which determines a control voltage v in accordance with the rightward or leftward deviation of the rotor 1 from the central position. The control voltage v is applied to either of power amplifiers 5 for the right and left electromagnet coils, and the control current I proportional thereto flows through the coil 2. The way of applying the control voltage v to the power amplifier 5 of the right or left coil is such that the self-centering effect of the rotor 1 is produced by the attractive force of the electromagnet coil 2.

Figure 2:
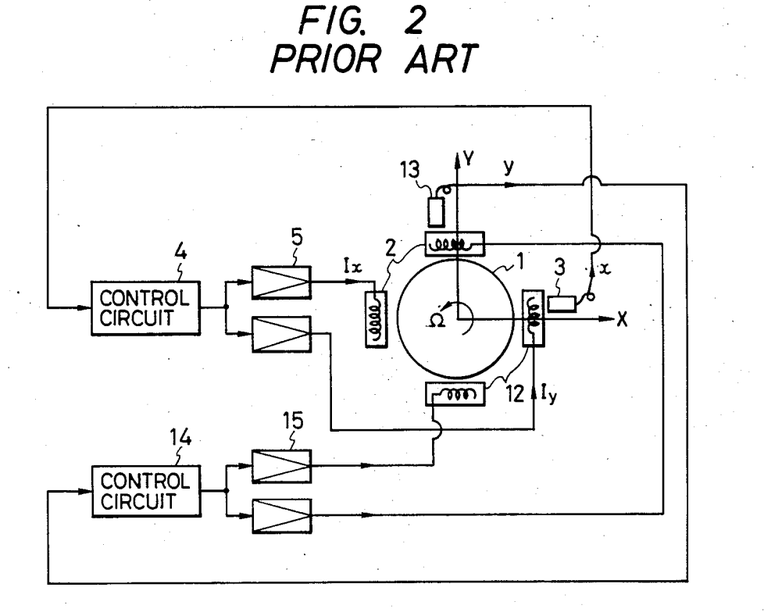
FIG. 2 is a diagram of the servo circuit arrangement of a rotor supported by an electromagnetic bearing in the prior art.

As thus far described, the servo circuit for the position control of the rotor 1 in the X direction is constructed of the single displacement sensor 3, the two right and left electromagnet coils 2 as well as the corresponding power amplifiers 5, and the single control circuit 4. In general, the position control of the rotor 1 by the magnetic bearing requires two-dimensional position controls in X- and Y-directions as shown in FIG. 2. Therefore, the servo circuits of the same specifications are juxtaposed as two sets for the X direction and for the Y direction.

In FIG. 2, portions having the same functions as in FIG. 1 are indicated by the same symbols.

Figure 3:
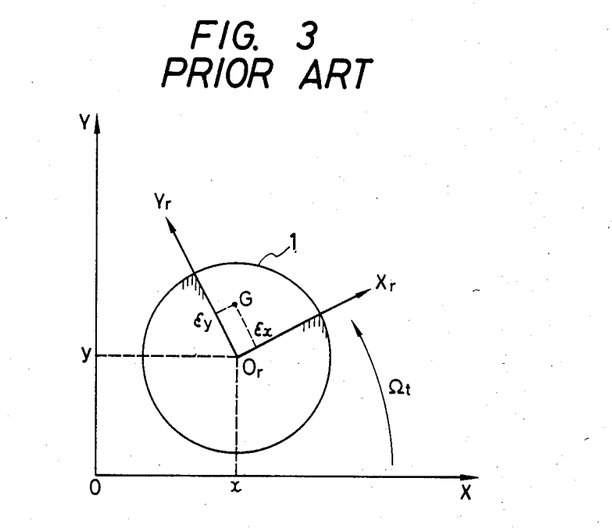
FIG. 3 is a dynamic model diagram showing the displacement and unbalance of the rotor in a prior art.

Next, the features of the vibrations of a rotation axis will be explained. For elucidating the unbalance vibration, FIG. 3 is often used. It is assumed that the axis $O_r$ of the rotor 1 lie at a displacement $(\chi, y)$ as viewed from a space fixed axis O-XY system. The position of the center of gravity G of the rotor 1 as viewed from a rotating axis $O_r$-$X_r Y_r$ system fixed to the rotor 1 is assumed $(\epsilon_\chi, \epsilon_y)$. Letting $\Omega$ denote the rotating speed of the rotor 1, an angle defined between the OX-axis is a rotational angle which is expressed by $\Omega t$ (t; time).

When such symbols are assigned, forces acting on the rotor 1 due to unbalance are as follows:

$$F_\chi = m\epsilon_\chi \Omega^2 \cos \Omega t \text{ in the X direction}$$

$$F_y = m\epsilon_y \Omega^2 \sin \Omega t \text{ in the Y direction} \quad (1)$$

where m denotes the mass of the rotor. They are indicated on a complex plane of $F = F_\chi + iF_y$ (where i: imaginary unit) as follows:

$$F = F_\chi + iF_y = m\epsilon \Omega^2 e^{i\Omega t} \quad (2)$$

where $\epsilon = \epsilon_\chi + i\epsilon_y$

Thus, they form a force rotating in the same direction as that of the rotation of the rotor, that is, a forward force.

On the other hand, the vibration of the rotor 1 is detected in the X and Y directions, and the vibration frequency agrees with the rotating speed $\Omega$, so that the vibration is expressed by the following forms:

$$\chi = a_\chi \cos (\Omega t - \theta_\chi) \text{ in the X direction}$$

$$y = a_y \cos (\Omega t - \theta_y) \text{ in the Y direction} \quad (3)$$

Figure 4A:
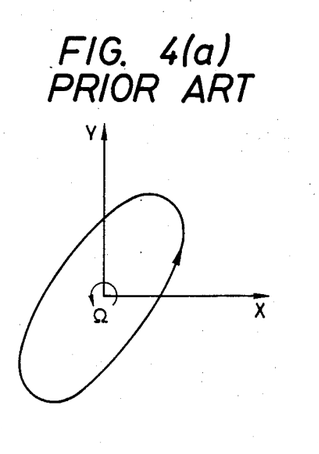
FIGS. 4(a) and 4(b) are diagrams each showing the shaking locus of the axis of a rotor under an unbalance vibration in the prior art.

Here, amplitudes in the X and Y directions are respectively denoted by $a_\chi$ and $a_y$, and phase delays viewed from the rotational angle $\Omega t$ are respectively denoted by $\theta_\chi$ and $\theta_y$. When the components of the vibration are indicated on a complex plane as in the above, the locus of the axis becomes an elliptical orbit as depicted in FIG. 4(a). Since $\theta_y - \theta_\chi < 180°$ holds here, the sense of the orbit is forward as indicated by an arrow similarly to the rotating direction $\Omega$.

When a supporting rigidity based on the electromagnets through the servo control circuit in the X direction is equal to the same in the Y direction, namely, when the supporting rigidities of the bearing in the X direction and the Y direction are set to be isotropic, the vibration amplitudes in the X direction and the Y direction are equal to each other. Moreover, the phase difference between both the vibration components is 90°, and the X-directional vibration leads the Y-directional vibration by 90°. These are expressed by the following equations:

$$a_\chi = a_y, \theta_y = \theta_\chi + 90° \quad (4)$$

These are a natural result for the reason that the unbalance force F acting on the rotor is isotropic in the X and Y directions as indicated by Eq. (2) and that the characteristics of the bearing to receive the unbalance force are also isotropic. The rotor vibration at this time is expressed as follows:

$$\chi = a \cos (\Omega t - \theta) \text{ in the X direction}$$

$$y = a \sin (\Omega t - \theta) \text{ in the Y direction} \quad (5)$$

Figure 4B:
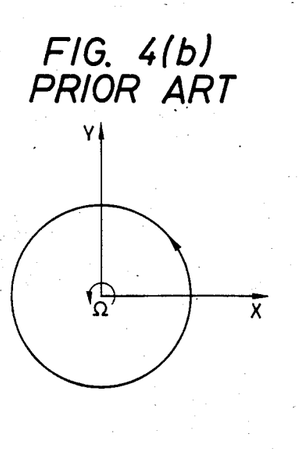

These become a circular motion as shown in FIG. 4(b) when observed as the locus of the rotor bearing similarly on a complex plane. The sense of the orbit is the same as that of the rotating speed $\Omega$ and is therefore forward.

As stated above, the rotor vibration becomes the circulr motion for the equal supporting rigidities of the bearing and becomes the elliptic orbit in the presence of anisotropy. The senses of the orbits are the same as the sense of the rotor rotation and are forward. Therefore, when a complex displacement Z indicated by the following equation is introduced:

$$Z = \chi + iy \tag{6}$$

the rotor vibration is expressed in the following complex forms:

$$Z = ae^{i\Omega t} \text{ for isotropic characteristics} \tag{7}$$

$$Z = a_f e^{i\Omega t} + a_b e^{-i\Omega t} \text{ for anisotropic characteristics} \tag{8}$$

where a, $a_f$ and $a_b$ are complex numbers expressing complex amplitudes respectively, and the following holds:

$$|a_f| > |a_b|$$

Figure 5:
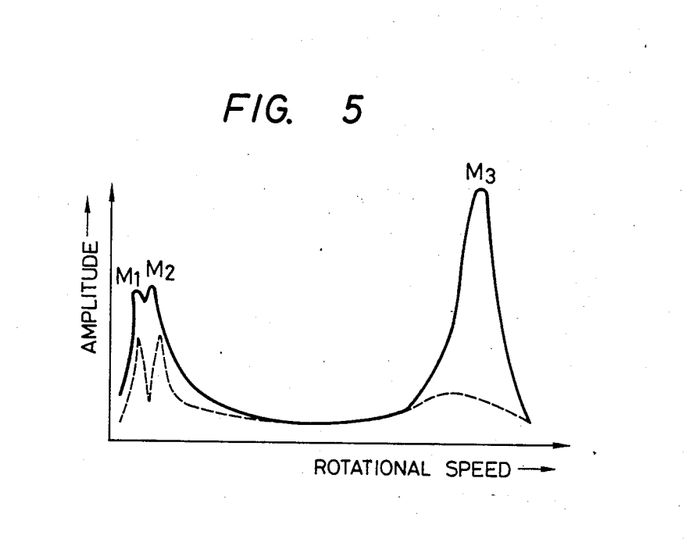
FIG. 5 is a diagram showing unbalance vibration response curves in the prior art and in the present invention.

In the case of the electromagnetic bearing support, it is generally true that the characteristics are sometimes anisotropic at low-speed rotations, but that they are more isotropic at higher-speed rotations owing to inertia. p An example of an unbalance vibration response curve is shown in FIG. 5. The two peaks $M_1$ and $M_2$ of the vibration amplitude on the lower side of the rotational speed are resonance points in the rigid body mode of the rotor. The third peak $M_3$ of the vibration amplitude is a resonance point in the bending mode of the rotor. Regarding the conventional rotor supported by the magnetic bearing, the resonance points of the rigid body mode at low speed can be passed with their amplitudes suppressed by the adjustments of the proportional action, differential action and integral action of the servo control circuit. The resonance point of the bending mode of a high-speed rotation, however, is inevitably passed with a sharp and large amplitude on account of an insufficient damping force. It is, rather, common that the rotor cannot be operated in excess of a rotational speed corresponding to the bending mode resonance point because the resonance amplitude of the bending mode cannot be suppressed even when those of the rigid body mode can be suppressed by skillfully adjusting the servo control circuit.

A servo control circuit for passing such a resonance point of the electromagnetic type rotor with the resonance amplitude suppressed is described in detail in Japanese Patent Provisional Publication No. 93853/'77. In order to grasp the published invention, the principle of a tracking filter synchronous with a rotational speed, which has been known, and a method of controlling high damping impartation with the tracking filter will be described in divided stages.

The general features of the rotor vibration in the case where the rotor is rotating in a high-speed rotation region will be explained in conjunction with FIG. 2. It is assumed that the rotor be rotating near the bending mode resonance point $M_3$ shown in FIG. 5. As the rotor vibration on this occasion, the forward vibration synchronous with the rotational frequency attributed to the unbalance is the principal component, and besides, the fluctuating vibration of the rotor attributed to external forces such as the shaking of a casing develops. The vibration frequency of the fluctuating vibration is close to the natural frequency of the rigid body mode and is lower than the rotational frequency. Therefore, the amplitude Z of the rotor vibration is written in the following complex from by applying the aforementioned equation (7):

$$Z_{in} = \text{(fluctuating vibration)} + ae^{i\Omega t} \tag{9}$$

Figure 6:
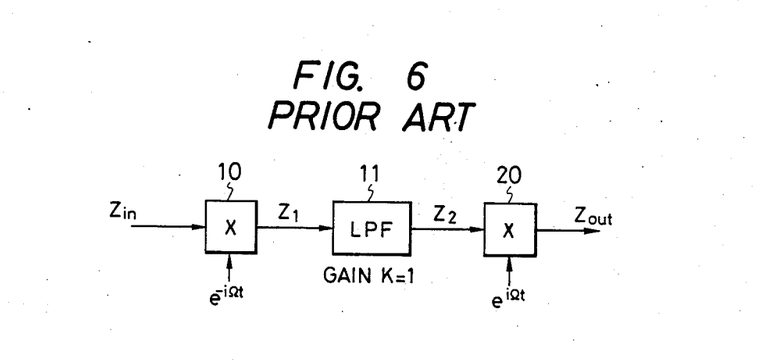
FIG. 6 is a diagram for explaining the principle of a known filter synchronized with a rotational speed.

FIG. 6 is a schematic arrangement diagram of a tracking filter for elucidating the operating principle thereof. When the amplitude $Z_{in}$ is input, the output $Z_{out}$ of the tracking filter becomes a signal of only the component synchronous with the rotational speed:

$$Z_{out} = ae^{i\Omega t} \tag{10}$$

In addition, the input signal $Z_{in}$ is transformed into a rotating coordinate system when multiplied by $e^{-i\Omega t}$ by means of a multiplier unit 10. That is:

$$Z_1 = e^{-i\Omega t} Z_{in} = \text{(fluctuating vibration)} \times e^{i\Omega t} + a \tag{11}$$

and the component a synchronous with the rotational speed becomes a D.C. component in the signal $Z_1$ of the rotating coordinate system. Besides, as seen from the first term of the above equation, the component having appeared as a low frequency in the fixed coordinate system $Z_{in}$ turns into a high frequency component in the rotating coordinate system $Z_1$.

Here, the signal $Z_1$ is passed through a low-pass filter 11 in order to extract the D.C. component a synchronous with the rotational speed. The output $Z_2$ of the filter is:

$$Z_2 \approx a \tag{12}$$

The cutoff frequency of the low-pass filter is much lower than the rotational frequency. It is usually set at several Hz or a still lower value of approximately 0.1 Hz. The gain of this low-pass filter is 1 (one).

Subsequently, the signal $Z_2$ of the rotating coordinate system is multiplied by $e^{i\Omega t}$ by means of a multiplier unit 20 in order to inversely transform it into the fixed coordinate system. As a result, the output signal $Z_{out}$ is obtained which is such that only the component synchronous with the rotational frequency is extracted from within the input signal $Z_{in}$ as indicated by Eq. (10).

Figure 7:
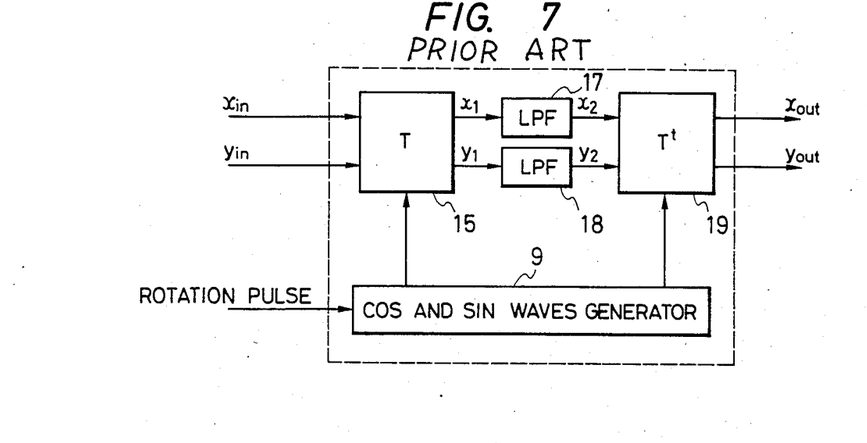
FIG. 7 is a circuit arrangement diagram of a prior-art tracking filter synchronized with a rotational speed.

The above is the principle of the filter for the component synchronous with the rotational speed. The filter is called the tracking filter when it follows the rotational speed $\Omega$. $e^{i\Omega t}$ is achieved by a process in which a cosine or sine function synchronous with the rotational speed is operated with a matrix. This mathematical principle is generated in the circuit in FIG. 7. In this figure, numeral 9 designates a generator which receives rotation pulses and generates sin and cos waves synchronous with them. Inputs $\chi_{in}$ and $y_{in}$ ($Z_{in} = \chi_{in} + iy_{in}$) are subjected to a matrix operation T by an operation unit 15, to obtain $\chi_1$ and $y_1$ ($Z_1 = \chi_1 + iy_1$):

$$\begin{bmatrix} x_1 \\ y_1 \end{bmatrix} = \begin{bmatrix} \cos\Omega t & \sin\Omega t \\ -\sin\Omega t & \cos\Omega t \end{bmatrix} \begin{bmatrix} \chi_{in} \\ y_{in} \end{bmatrix} = T \begin{bmatrix} \chi_{in} \\ y_{in} \end{bmatrix} \tag{13}$$

Thereafter, $\chi_1$ and $y_1$ are passed through low-pass filters 17 and 18 independently of each other, to obtain $\chi_2$ and $y_2$ ($Z_2 = \chi_2 + iy_2$). Further, these signals are subjected to the inverse transform of the transform T by a transposed-matrix operation unit 19, to find $\chi_{out}$ and $y_{out}$ ($Z_{out} = \chi_{out} + iy_{out}$):

$$\begin{bmatrix} \chi_{out} \\ y_{out} \end{bmatrix} = \begin{bmatrix} \cos\Omega t & -\sin\Omega t \\ \sin\Omega t & \cos\Omega t \end{bmatrix} \begin{bmatrix} \chi_2 \\ y_2 \end{bmatrix} = T \begin{bmatrix} \chi_2 \\ y_2 \end{bmatrix} \quad (14)$$

In this way, only the rotation-synchronous components can be extracted from within the $\chi$ displacement signal and y displacement signal by the actual electronic circuit.

Next, the resonant amplitude reduction method employing this tracking filter synchronous with the rotational speed as described in Japanese Patent Provisional Publication No. 93853/'77 will be described with reference to FIG. 8.

It is assumed that the displacements of the rotor in the X direction and the Y direction have been detected as $\underline{\chi}$ and $\underline{y}$. The circuit is of a feed system wherein, when the displacement signals $\underline{\chi}$ and $\underline{y}$ are input to proportion-plus-differential circuits 6 and 16, outputs $a\chi + b\dot{\chi}$ and $ay + b\dot{y}$ are provided, respectively. The X-directional output signal $a\chi + b\dot{\chi}$ and Y-directional output signal $ay + b\dot{y}$ thus derived are input to the tracking filter 7 synchronous with the rotational speed as described above.

The first process in the tracking filter is a transformation into the rotating coordinate system based on the following equation:

$$\begin{bmatrix} \chi_1 \\ y_1 \end{bmatrix} = \begin{bmatrix} \cos\Omega t & \sin\Omega t \\ -\sin\Omega t & \cos\Omega t \end{bmatrix} \begin{bmatrix} a\chi + b\dot{\chi} \\ ay + b\dot{y} \end{bmatrix} \quad (15)$$

By the second process, signals are passed through low-pass filters of gains K (corresponding to the operation of integrating narrow bands) to obtain the signals $\chi_2$ and $y_2$. The second process performs filtering operations for the X and Y directions separately from each other. By the third process, the output signals $\chi_0$ and $y_0$ are obtained through the inverse transform into the fixed coordinate system:

$$\begin{bmatrix} \chi_0 \\ y_0 \end{bmatrix} = \begin{bmatrix} \cos\Omega t & -\sin\Omega t \\ \sin\Omega t & \cos\Omega t \end{bmatrix} \begin{bmatrix} \chi_2 \\ y_2 \end{bmatrix} \quad (16)$$

The output signals $\chi_0$ and $y_0$ are such that, in the vibration waveforms of the input signals $\chi$ and y, only the components synchronous with the rotational speed have been extracted. By adjusting the magnitudes of the coefficients a and b of the proportional-plus-differential circuits 6 and 16 or the value of the gain K of the low-pass filter, the operations of advancing the phases of the rotational speed-synchronous components of the signals $\chi$ and y can be afforded. That is, the actions of damping the resonance amplitudes can be achieved.

Figure 8:
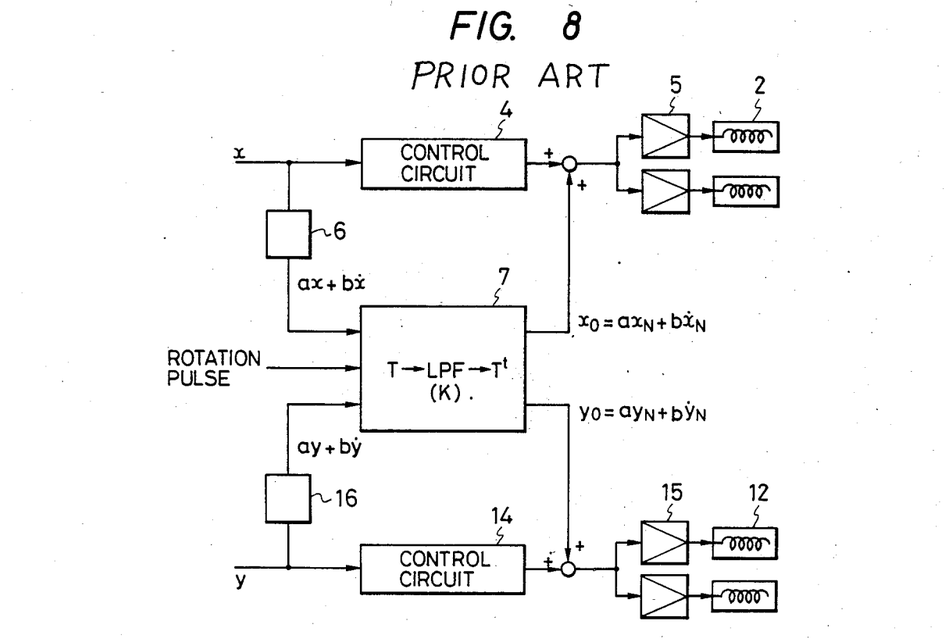
FIG. 8 is a block diagram of a prior-art device for damping a critical frequency.

In the critical frequency damping equipment shown in FIG. 8, for the purpose of reducing the resonance amplitude in the X direction by way of example, the $\chi$ displacement signal is input to the control circuit 4, while at the same time the $\chi_0$ signal with only the rotation-synchronous component extracted from within the above $\chi$ displacement signal through the tracking filter 7 is used for the servo control. The same applies to the Y direction. By utilizing the $x_0$ and $y_0$ signals for the servo control, the components synchronous with the rotational speed can be endowed with the phase advance characteristics through the adjustments of the coefficients $\underline{a}$ and $\underline{b}$ or the gain K. Thus, the rotor is given the damping action, and the resonance points as shown in FIG. 5 can be passed with smaller amplitudes as indicated by a broken line.

Such a control system, however, has the disadvantage that the velocity signals ($\dot{\chi}$, $\dot{y}$) need to be created from the displacement signals ($\chi$, y) by the proportional-plus-differential circuits 6 and 16, so the circuit arrangement becomes complicated.

The essence of this system is as stated below. The velocity signals $\dot{\chi}$ and $\dot{y}$ are created from the detected displacement signals $\underline{\chi}$ and $\underline{y}$ through the differential circuits, and the displacement signals and the velocity signals are passed through the tracking filter 7 synchronized with the rotational speed. Thus, only the rotation-synchronous components of the displacements and velocities are extracted so as to be supplied for the control of only the unbalance vibration components thereof. The bearing rigidity can be adjusted in accordance with the magnitudes of the displacement components, while the bearing damping can be adjusted in accordance with the magnitudes of the velocity components.

SUMMARY OF THE INVENTION

An object of the present invention is to provide a control apparatus for an electromagnetic bearing in which the resonance amplitude of the rotational speed-synchronous unbalance vibration of a rotor supported by the electromagnetic bearing is reduced.

In the control apparatus for an electromagnetic bearing according to the present invention, the channels of an X-direction control circuit and a Y-direction control circuit are crossed to enhance stability against a forward characteristic frequency. In order to solve the problem that stability against a coexisting rearward characteristic frequency is reduced without any measuring, a tracking filter synchronized with a rotational frequency is jointly used. Thus, the enhancement of the stability is permitted against only the forward characteristic frequency near a resonance point, whereby the resonance amplitude of the unbalance vibration can be reduced.

DETAILED DESCRIPTION OF THE PREFERRED EMBODIMENTS

In a rotor supported by plain bearings, it is known that a self-excited vibration called 'oil whip' develops. The causes will be considered. The reaction of an oil film in the plain bearing is expressed with respect to the displacement and velocity of the rotor, as follows:

$$F_{102} = k_{\chi\chi}\chi + k_{\chi y}y + c_{\chi\chi}\dot{\chi} + c_{\chi y}\dot{y} \qquad (17)$$
$$F_y = k_{y\chi}\chi + k_{yy}y + c_{y\chi}\dot{\chi} + c_{yy}\dot{y}$$

where $F_\chi$, $F_y$: reaction forces of the bearing in X and Y directions, $k_{ij}$(i, j=$\chi$, y): elastic constant of the oil film of the plain bearing, $c_{ij}$(i, j=$\chi$, y): damping constant of the oil film of the plain bearing.

Conceptually speaking, the constants $k_{\chi\chi}$ and $k_{yy}$ or those $c_{\chi y}$ and $c_{y\chi}$ act as bearing rigidities. In addition, since the constants $c_{\chi\chi}$ and $c_{yy}$ act to damp the bearing, they exert the action of stabilizing the rotor. Meanwhile, the constants $k_{\chi y}$ and $k_{y\chi}$ indicate the crossing terms of the X and Y directions and form causes for rendering the rotor vibration unstable. Particularly at a rotational frequency for which $k_{\chi y} > 0$ and $k_{y\chi} < 0$ holds, the forward unstable vibration called the oil whip arises in the rotor. That is, stability against a forward characteristic frequency is reduced, and the damping action decreasing. Since the plain bearing is a passive element, the sign of the constant cannot be changed, and an action in the reverse direction cannot be produced.

With an electromagnetic bearing, however, the sign can be reversed by the arrangement of an electronic circuit so as to produce the action in the reverse direction, namely, the damping action. That is, when the channels of an X-direction control circuit and a Y-direction control circuit are crossed so as to establish $k_{\chi y} < 0$ and $k_{y\chi} > 0$, the stability against the forward characteristic frequency can be enhanced. In addition, according to such crossing of the channels, stability against a coexisting rearward characteristic frequency is reduced.

Therefore, the rotation-synchronized tracking filter described above is jointly used, whereby the enhancement of the stability becomes possible as to only the forward characteristic frequency near a resonance point. Also, the stability against the rearward characteristic frequency remains unchanged and is not reduced.

In this manner, using both the channel crossing and the rotation-synchronized tracking filter, the enhancement of the characteristic frequency stability or damping capability is achieved as regards only the forward component. An unbalance vibration is a forward force, and the resonance peak thereof to be induced can be reduced to a smaller resonance amplitude as the damping of the forward characteristic frequency is greater.

Figure 9:
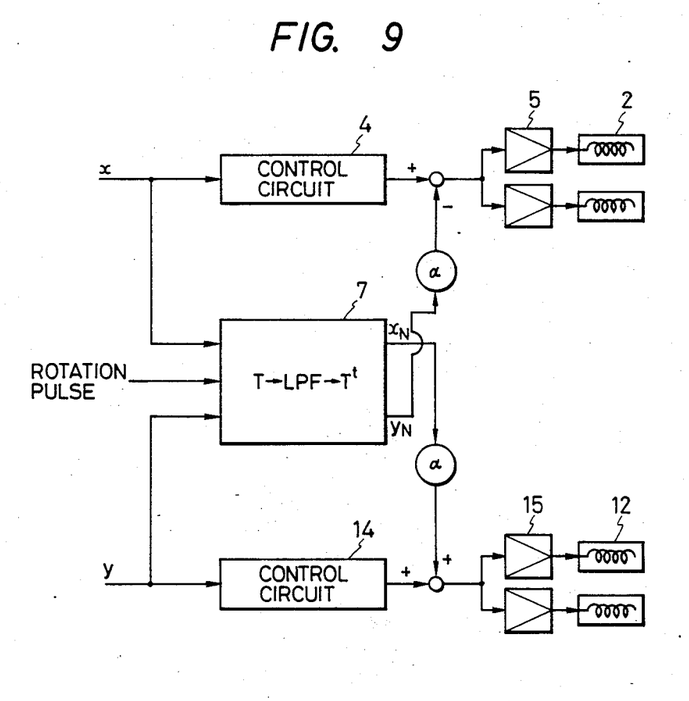
FIG. 9 is a block diagram showing an embodiment of a servo control system according to the present invention.

Now, an embodiment of the present invention will be described with reference to FIG. 9. A displacement signal $\chi$ detecting the displacement of a rotor in an X direction is input to a control circuit 4, the calculated result of which is applied to a power amplifier 5 so as to cause a control current $i_n$ to flow through an electromagnet 2. The same applies to a Y direction. Such a setup is the basic setup of a servo control system based on an electromagnetic bearing as illustrated in FIG. 2.

The detected displacement signals $\chi$ and y are input to a tracking filter 7 for components synchronous with a rotation speed, to extract only the rotation-synchronous components $\chi_n$ and $y_N$ in the displacement vibration components of the rotor. When the bearing is isotropic, the unbalance vibration thereof $Z_N = \chi_N + iy_N$ becomes:

$$Z_N = a \cdot e^{j\Omega t} \qquad (18)$$

as indicated in Eq. (7). That is, $$\chi_N = a_N \cos(\Omega t - \theta_N) \qquad (19)$$
$$y_N = a_N \sin(\Omega t - \theta_N)$$

where $a = a_N e^{j\theta_N}$ holds.

Also, the following relations hold:

$$\dot{\chi}_N = -\Omega y_N, \dot{y}_N = +\Omega \chi_N \qquad (20)$$

This concerns the fact that the unbalance vibration becomes a circular orbit as shown in FIG. 4(b) and proceeds in the same direction as the rotation from an X-axis to a Y-axis. With such a circular orbit, a vibration 90° ahead of the $\chi$ vibration is predicted to be the y vibration, and a vibration 90° ahead of the y vibration is predicted to be the $-\chi$ vibration. Since this prediction signifies a differential operation, the above equations are physically comprehensible.

When note is taken of only the unbalance vibration components, Eqs. (20) hold, and hence, the output signals $\chi_N$ and $y_N$ of the tracking filter 7 may be respectively regarded as differential signals $y_N$ and $-\chi_N$. Therefore, in order to afford a damping action in the Y direction, the $\chi_N$ signal is multiplied by $\alpha$, and the product is additively input to the Y-direction channel. On the other hand, in order to afford a damping action in the X direction, the $y_N$ signal is multiplied by $-\alpha$, and the product is subtractively input to the X-direction channel. In FIG. 9, the multiplication by $-\alpha$ is indicated as a subtractive input in the X direction.

In this manner, the additive and subtractive inputs are applied crossing the channels, whereby reaction forces for the components synchronous with the rotational speed are expressed as:

$$F_\chi = -\alpha y_N \equiv k_{\chi y} y \qquad (21)$$

$$F_y = +\alpha \chi_N \equiv k_{y\chi}\chi \qquad (22)$$

This corresponds to the fact that $k_{\chi y} < 0$ and $k_{y\chi} > 0$ are set. Therefore, the goal of enhancing the damping capability for the forward vibration of the rotor is accomplished.

The coefficient $\alpha$ which is used for the additive and subtractive inputs in the channel crossing, provides an improved damping effect. Since, however, there is the restriction of preventing the saturation of the electronic circuit, the gain may be adjusted so as to establish an appropriate value of the resonance amplitude.

Figure 10:
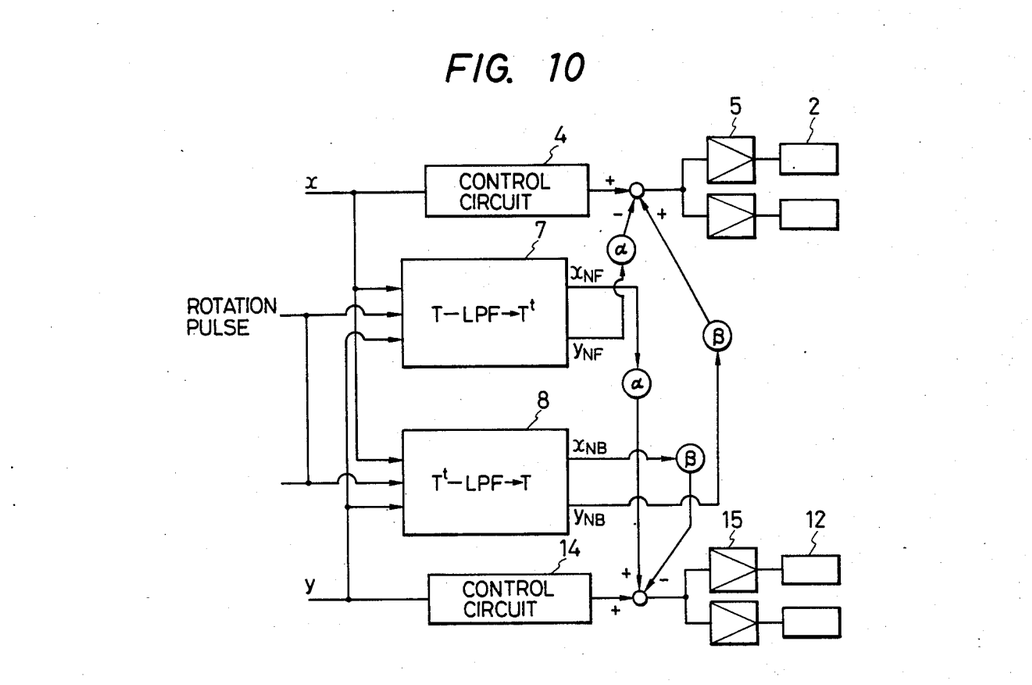
FIG. 10 is a block diagram of a servo control system based on an embodiment of the present invention in the case of anisotropic supporting characteristics.

FIG. 10 shows a circuit arrangement well suited to the general case where the characteristics of the bearing are anisotropic to give rise to the unbalance vibration as illustrated by the elliptic orbit in FIG. 4(a) or by Eq. (8).

In this case, the method of suppressing the forward vibration $a_f e^{i\Omega t}$ of Eq. (8) is the same as in the preceding case of FIG. 9. The method of suppressing the rearward vibration component $a_b e^{-i\Omega t}$ may be the reverse of the processing for the forward component. A tracking filter to be used has the arrangement of a filter 8 for synchronization with a reverse-rotational speed. The coefficients of additive and subtractive inputs in the channel crossing of the outputs of the tracking filter 8 may be $\beta$'s whose signs are opposite to those of the coefficients $\alpha$'s.

Figure 11:
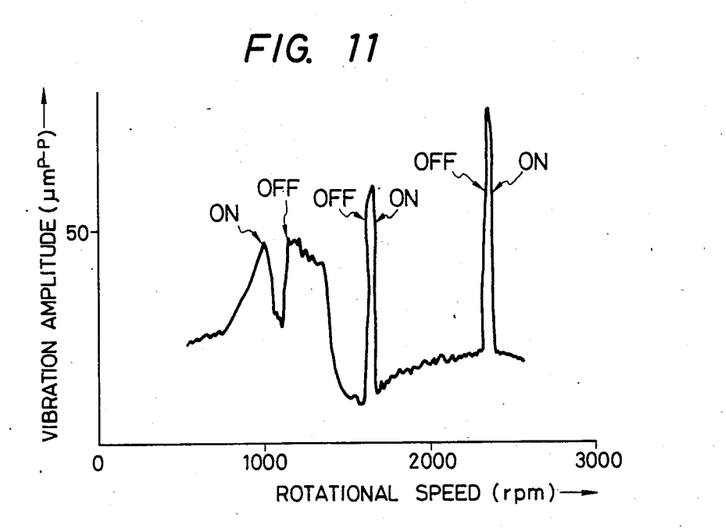
FIG. 11 is a graph of test data in the present invention.

FIG. 11 shows experimental data obtained when the rotation-synchronous tracking filter and the channel crossing in the present invention were employed. The rotational speed is shown on the axis of abscissas, while the vibration amplitude is shown on the axis of ordinates. In the figure, "ON" signifies that the operation of the present invention in FIG. 9 was performed. "OFF" signifies that the channel crossing was turned off (corresponding to $\alpha=0$). It is seen that the vibration amplitude is significantly lowered by the turn-ON, and that it reverts to the original high value due to the turn-OFF.

Thus, according to the method of the present invention, even the resonance amplitude of the bending mode as shown in FIG. 5 is properly damped, and the rotor is permitted to pass the dangerous speed with the small resonance amplitude as indicated by the dotted line.

According to the present invention, the following effects can be achieved:

(a) Any differential circuit need not be added, instead, the channels may be crossed, so that the number of components required is small.

(b) Since a damping force for a forward vibration at a passage through a resonance point can be enhanced, the resonance point can be passed with the unbalance vibration suppressed to a small resonance amplitude.

(c) Even when the balance precision of a rotor is somewhat inferior, the passage through the resonance point is permitted, and hence, balancing operations are simplified.

What is claimed is:

1. A control apparatus for a rotor supported by an electromagnetic bearing, comprising:

an X-direction servo circuit including an X-directional displacement detector which detects an X-axial deviation of the rotor from a preset radial position, and a control circuit which generates a signal for controlling the X-axial position of the rotor so as to be held at the preset radial position, on the basis of an X-directional displacement signal output from said X-directional displacement detector, a Y-direction servo circuit including a Y-directional displacement detector which detects a Y-axial deviation of the rotor from a preset radial position, and a control circuit which generates a signal for controlling the Y-axial position of the rotor so as to be held at the preset radial position, on the basis of a Y-directional displacement signal output from said Y-directional displacement detector, a rotational frequency-synchronized tracking filter whose center frequency is a frequency corresponding to a rotational speed of the rotor, means for applying the X-directional displacement signal to said filter as an input signal and to additively supply said Y-direction servo circuit with an X-directional output signal delivered from said filter, and means for applying the Y-directional displacement signal to said filter as an input signal and to subtractively supply said X-direction servo circuit with a Y-directional output signal delivered from said filter.

2. A control apparatus for a rotor supported by an electromagnetic bearing as defined in claim 1, wherein both the X-directional output signal and the Y-directional output signal of said rotational frequency-synchronized tracking filter are multiplied by $\alpha$, which is a coefficient to provide additive and subtractive inputs to said Y- and X-direction servo circuits, respectively, prior to being applied to said Y-direction servo circuit and said X-direction servo circuit, respectively.

3. A control apparatus for a rotor supported by an electromagnetic bearing, comprising:

an X-direction servo circuit including an X-directional displacement detector which detects an X-axial deviation of the rotor from a preset radial position, and a control circuit which generates a signal for controlling the X-axial position of the rotor so as to be held at the preset radial position, on the basis of an X-directional displacement signal output from said X-directional displacement detector, a Y-direction servo circuit including a Y-directional displacement detector which detects a Y-axial deviation of the rotor from a preset radial position, and a control circuit which generates a signal for controlling the Y-axial position of the rotor so as to be held at the preset radial position, on the basis of a Y-directional displacement signal output from said Y-directional displacement detector, a rotational frequency-synchronized tracking filter whose center frequency is a frequency corresponding to a rotational speed of the rotor, means for applying the X-directional displacement signal to said filter as an input signal and to additively supply said Y-direction servo circuit with an X-directional output signal delivered from said filter, and means for applying the Y-directional displacement signal to said filter as an input signal and to subtractively supply said X-direction servo circuit with a Y-directional output signal delivered from said filter, a rotational frequency-synchronized filter of reverse rotation which performs signal processing inverse to that of said rotational frequency-synchronized tracking filter, means for applying the X-directional displacement detection signal to said rotational frequency-synchronized filter of reverse rotation as an input signal and to subtractively supply said Y-direction servo circuit with an X-directional output signal delivered from said filter of reverse rotation, and means to apply the Y-directional displacement detection signal to said rotational frequency-synchronized filter of reverse rotation as an input signal and to additively supply said X-direction servo circuit with a Y-directional output signal delivered from said filter of reverse rotation.

4. A control apparatus for a rotor supported by an electromagnetic bearing as defined in claim 3, wherein both the X-directional output signal and the Y-directional output signal of said rotational frequency-synchronized tracking filter are multiplied by $\alpha$, which is a coefficient to provide additive and subtractive inputs to said X- and Y-direction servo circuits, respectively, prior to being applied to said Y-direction servo circuit and said X-direction servo circuit, respectively, and both the X-directional output signal and Y-directional output signal of said rotational frequency-synchronized filter of reverse rotation are multiplied by $\beta$, which is a coefficient to provide subtractive and additive inputs to said Y- and X-direction servo circuits, respectively, prior to being applied to said Y-direction servo circuit and said X-direction servo circuit, respectively.

* * * * *